(12) United States Patent
Coscarella

(10) Patent No.: US 6,499,503 B2
(45) Date of Patent: Dec. 31, 2002

(54) BACKFLOW VALVE

(76) Inventor: Gabe Coscarella, 15703 - 64 St., Edmonton, Alberta (CA), T5Y 2N5

( * ) Notice: Subject to any disclaimer, the term of this patent is extended or adjusted under 35 U.S.C. 154(b) by 0 days.

(21) Appl. No.: 09/745,578

(22) Filed: Dec. 21, 2000

(65) Prior Publication Data

US 2001/0023708 A1 Sep. 27, 2001

(30) Foreign Application Priority Data

Mar. 24, 2000 (CA) .............................................. 2302714

(51) Int. Cl.$^7$ .......................... F16K 31/18; F16K 15/03
(52) U.S. Cl. ...................... 137/420; 137/409; 137/448; 137/527.8; 251/284; 251/305
(58) Field of Search ..................... 137/315.08, 409, 137/410, 420, 434, 448, 527, 527.8; 251/284, 303, 305; 495/96, 97, 100

(56) References Cited

U.S. PATENT DOCUMENTS

| | | | |
|---|---|---|---|
| 194,676 A | 8/1877 | Hansen | |
| 199,696 A | 1/1878 | Dikeman | |
| 289,108 A | 11/1883 | Johnson | |
| 1,205,199 A | 11/1916 | Healy | |
| 1,584,666 A | 5/1926 | Shockley | |
| 1,606,396 A | 11/1926 | Blom | |
| 1,861,397 A | 5/1932 | Khun | |
| 1,864,443 A | 6/1932 | Khun | |
| 1,924,498 A | 8/1933 | House | 182/22 |
| 2,638,178 A | 5/1953 | McRill | 182/25 |
| 2,695,072 A | 11/1954 | Hauslein | 182/1 |
| 2,877,792 A * | 3/1959 | Tybus | 137/512.1 |
| 2,928,410 A | 3/1960 | Del Vecchio | 137/115 |
| 3,074,427 A * | 1/1963 | Wheeler, Jr. | 137/315.16 |
| 3,176,707 A | 4/1965 | Wilson | 137/315 |
| 3,327,732 A * | 6/1967 | Deve | 137/527.8 |
| 3,626,521 A | 12/1971 | Delco | 4/85 |
| 3,781,920 A | 1/1974 | Browne et al. | 4/85 |
| 3,933,444 A | 1/1976 | Kilgore | 48/192 |
| 3,974,654 A | 8/1976 | Mirto, Jr. | 61/17 |
| 4,324,506 A | 4/1982 | Steinke | 405/96 |
| 4,503,881 A | 3/1985 | Vecchio | 137/425 |
| 4,544,027 A | 10/1985 | Goldberg et al. | 165/95 |
| 4,787,103 A | 11/1988 | Endo | 4/441 |
| 4,844,610 A | 7/1989 | North, Jr. | 356/73 |
| 4,891,994 A | 1/1990 | Barba | 74/2 |
| 4,942,898 A * | 7/1990 | Osowski | 137/454.2 |
| 5,234,018 A | 8/1993 | Grachal et al. | 137/244 |
| 5,406,972 A | 4/1995 | Coscarella et al. | 137/315 |
| 5,669,405 A | 9/1997 | Engelmann | 137/115.07 |
| 5,819,791 A | 10/1998 | Chronister et al. | 137/512.1 |
| 5,934,313 A | 8/1999 | Brothers et al. | 137/351 |
| 5,947,152 A | 9/1999 | Martin et al. | 137/527.2 |
| 6,029,684 A * | 2/2000 | Watts | 137/15.19 |

FOREIGN PATENT DOCUMENTS

CA    2114602    7/1997    ............. E03F/7/04

OTHER PUBLICATIONS

Product information for the ZURN Z–1091 Backwater Valve, Zurn Industries Limited, 1 page, dated at least as early as Dec. 2000.

* cited by examiner

Primary Examiner—Michael Powell Buiz
Assistant Examiner—Ramesh Krishnamurthy
(74) Attorney, Agent, or Firm—Davis & Bujold, P.L.L.C.

(57) ABSTRACT

A backflow valve has a closure gate that is pivotally mounted for movement between an open position in which the closure gate is positioned on a plane substantially parallel to a longitudinal axis of a flow passage and a closed position in which the closure gate is positioned transverse to the longitudinal axis. The closure gate has a midsection positioned pivot axis and is unbalanced with greater weight being toward the first end. A rotational stop limits pivotal movement when the closure gate is in the open position. A float is secured to the first end of the closure gate. The greater weight at the first end biases the closure gate by force of gravity against the rotational stop and into the open position. The float causes the closure gate to pivotally move to the closed position in response to liquid rising in the flow passage.

2 Claims, 4 Drawing Sheets

BACKFLOW VALVE

FIELD OF THE INVENTION

The present invention relates to a backflow valve.

BACKGROUND OF THE INVENTION

A backflow valve, also known as a backwater valve, is used to prevent a reversal of flow in a flow line. An example of a backflow valve is disclosed in Canadian Patent 2,114, 602 and corresponding U.S. Pat. No. 5,406,972 granted to Coscarella et al.

The Coscarella et al reference discloses a backflow valve that has a pivoting closure gate with an open position to accommodate flow in a desired flow direction and a closed position to close off the flow line when there is a reversal of flow. The closure gate is hinged to the bottom of the valve housing. In the open position, flow passes over the closure gate with the closure gate serving as a spillway. Secured to the closure gate is a float. When the level of liquid rises, the float causes the closure gate to rise and the reversed direction of flow pushes the closure gate into the closed position.

The Coscarella et al valve has proven to be an effective backflow valve. The fact that the closure gate in the open position serves as a spillway is not suitable for use with liquids that are highly caustic, leave a residue, or carry debris that can adversely affect the operation of the valve over time.

SUMMARY OF THE INVENTION

What is required is an alternative configuration of backflow valve in which the closure gate does not serve as a spillway.

According to the present invention there is provided a backflow valve which includes a valve body with a flow passage extending through the valve body having a longitudinal axis. A closure gate is provided having a first end and a second end. The closure gate is pivotally mounted in the flow passage of the valve body for movement between an open position in which the closure gate is positioned on a plane substantially parallel to the longitudinal axis of the flow passage and a closed position in which the closure gate is positioned transverse to the longitudinal axis. The closure gate has a midsection positioned pivot axis positioned between the first end and the second end. The closure gate is unbalanced with greater weight being toward the first end. A rotational stop is secured to the valve body to limit pivotal movement when the closure gate is in the open position. The greater weight at the first end of the closure gate biases the closure gate by force of gravity against the rotational stop and into the open position. A float secured to the first end of the closure gate causes the closure gate to pivotally move in response to a rise in liquid in the flow passage, with a reversal of flow pushing the closure gate to the closed position.

The flow lines that backflow valves are used with typically are rated at 50% of their flow capacity. This means that the flow line for liquid passing through the flow passage is generally below the longitudinal axis of the flow passage. With the backflow valve, as described above, in the open position the closure gate sits parallel to and above the flow line. The closure gate is only exposed to the liquid when the level of liquid rises due to a reversal in flow.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
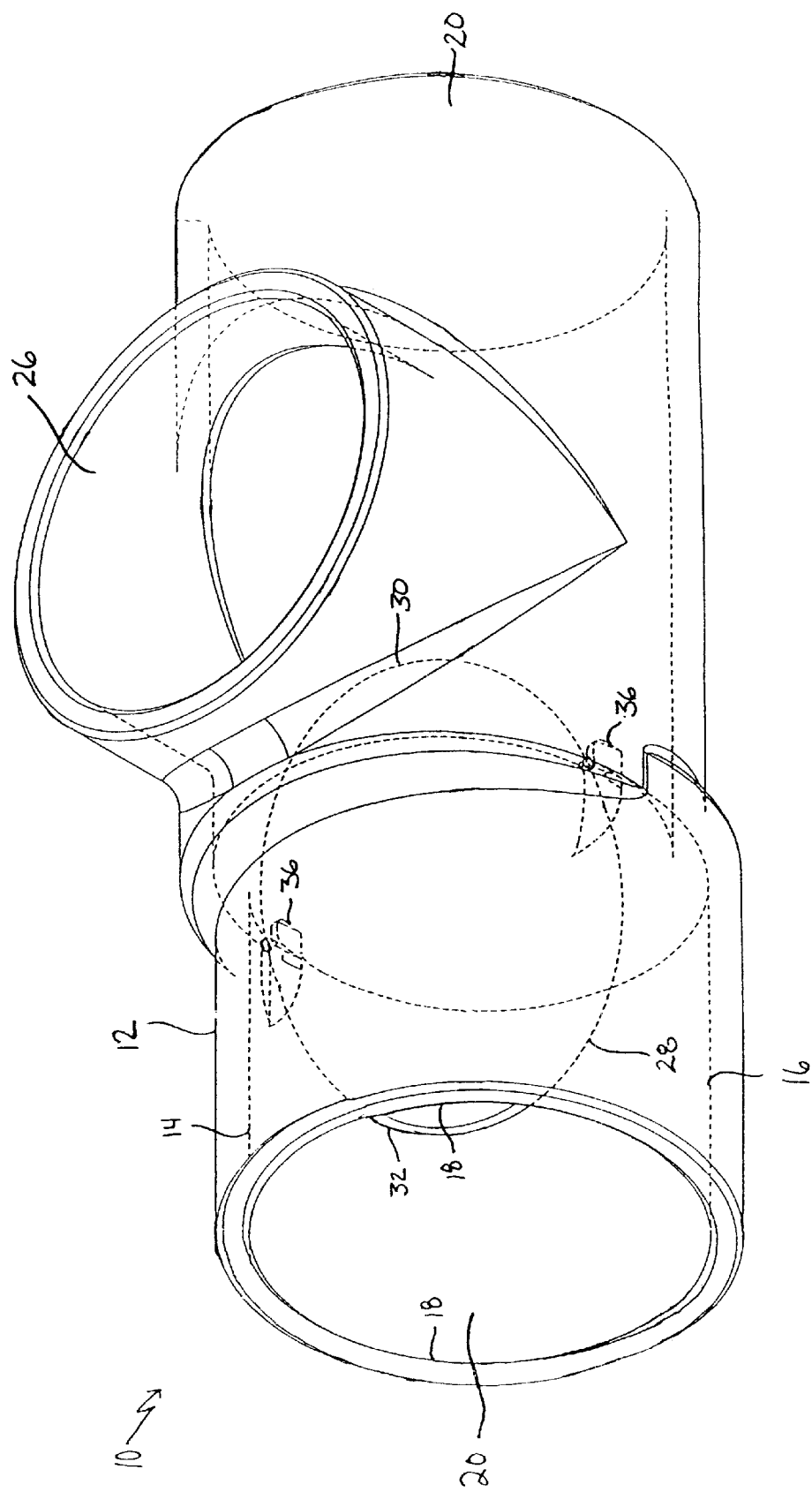
FIG. 1 is a transparent perspective view of a backflow valve constructed in accordance with the teachings of the present invention.

The preferred embodiment, a backflow valve generally identified by reference numeral 10, will now be described with reference to FIGS. 1 through 4.

Figure 2:
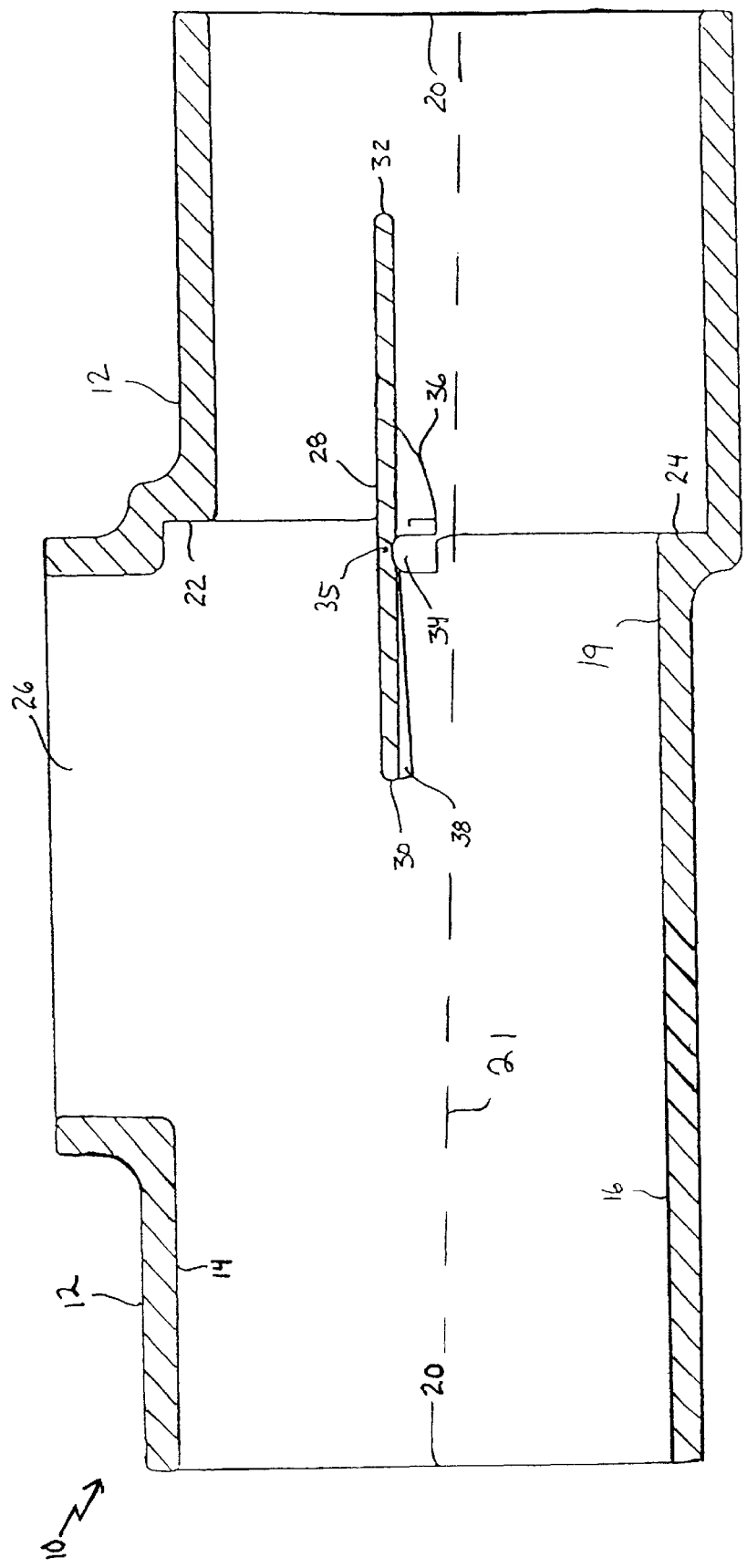
FIG. 2 is a side elevation view, in section, of the backflow valve illustrated in FIG. 1, in an open position.

Referring to FIG. 1, there is provided a backflow valve 10, comprised of a valve body 12 adapted for use in a substantially horizontal orientation. Valve body 12 has a top 14, bottom 16 and opposed sides 18. Referring to FIG. 2, a flow passage 20 extends through valve body 12, with flow passage 20 having a substantially horizontal longitudinal axis 21. Valve body 12 has an interior surface 19 which serves to define flow passage 20. Interior surface 19 has a first sealing shoulder 22 positioned at top 14 of valve body 12 and a second sealing shoulder 24 positioned at bottom 16 of valve body 12. A clean out passage 26 is located in top 14 of valve body 12.

Figure 4:
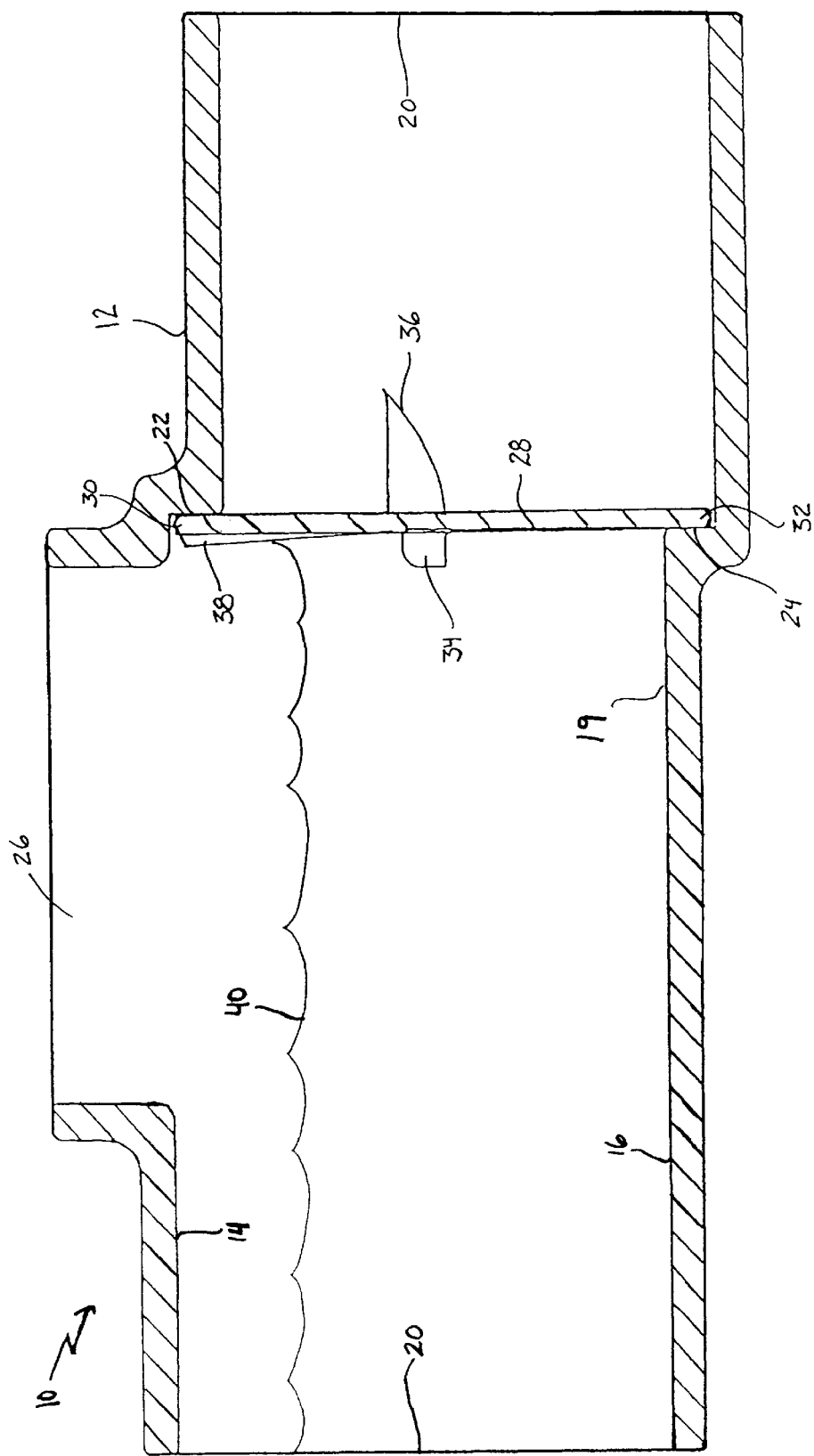
FIG. 4 is a side elevation view, in section, of the backflow valve illustrated in FIG. 1, in a closed position.

Referring to FIGS. 2 and 4, a closure gate 28 is pivotally mounted in flow passage 20 of valve body 12 for movement between an open position in which closure gate 28 is positioned on a plane substantially parallel to and above the longitudinal axis 21 of flow passage 20 as illustrated in FIG. 2 and a closed position in which closure gate 28 is positioned transverse to longitudinal axis 21 as illustrated in FIG. 4. Referring to FIG. 2, closure gate 28 has a first end 30, a second end 32, and a midsection positioned pivot axis 34 which extends through an asymmetrical centroid 35 of closure gate 28. The closure gate is unbalanced with greater weight being toward the first end.

Figure 3:
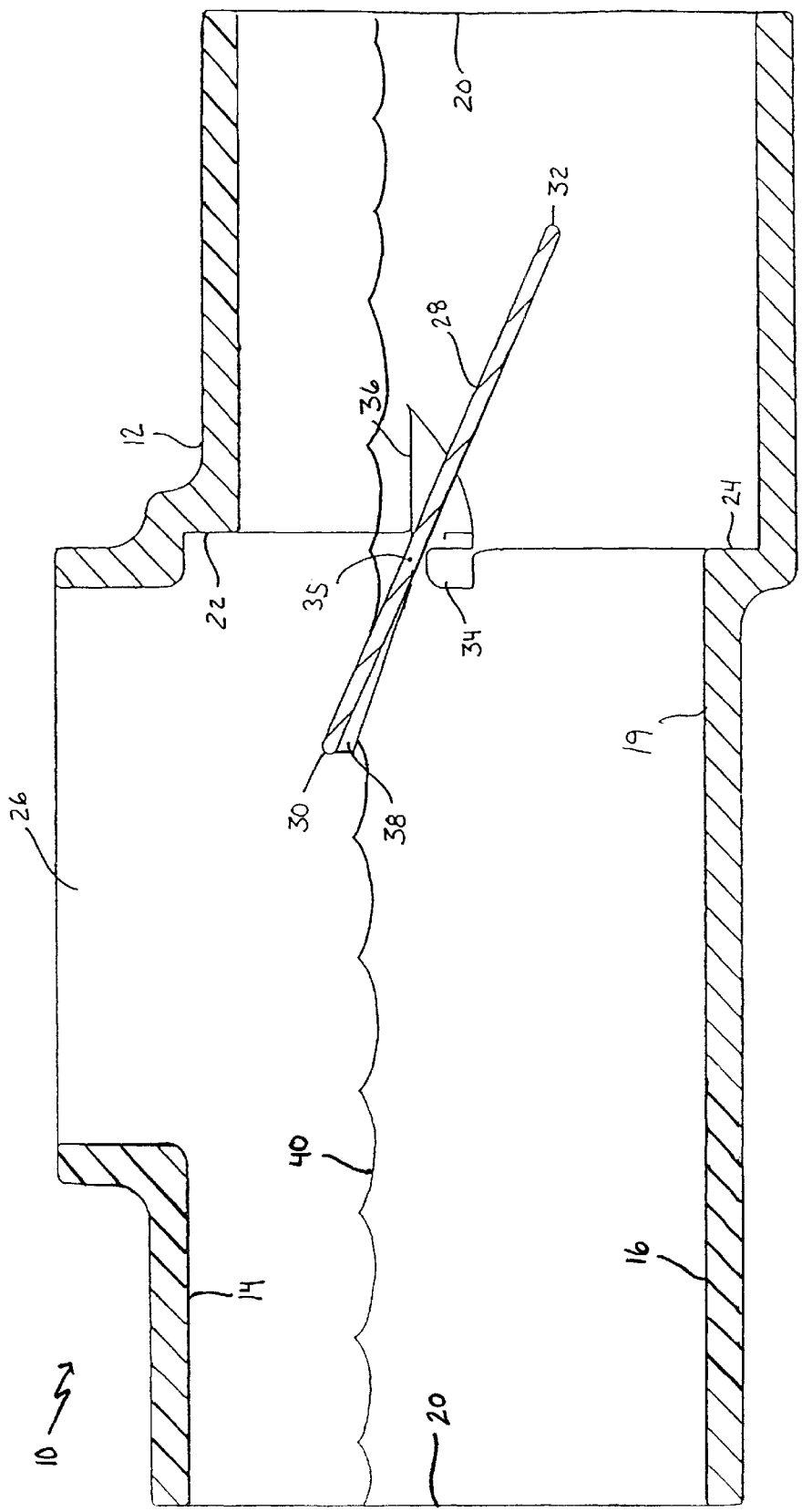
FIG. 3 is a side elevation view, in section, of the backflow valve illustrated in FIG. 1, in the process of moving from an open position to a closed position.

Referring to FIG. 1, rotational stops 36 protrude from each of opposed sides 18. Rotational stops 36 limit the pivotal direction closure gate 28 can pivot in the open position. Referring to FIG. 3, a float 38 is secured to first end 30 of closure gate 28. In the absence of liquid, the greater weight at first end 30 biases closure gate 28 into the open position resting against rotational stops 36. Float 38 causes closure gate 28 to pivotally move in response to a rise in liquid 40 in flow passage 20 with a reversal of flow pushing closure gate 28 to the closed position.

Referring to FIG. 4, when in the closed position first end 30 of closure gate 28 will engage with first sealing shoulder 22 at top 14 of valve body 12 and second end 32 of closure gate 28 will engage second sealing shoulder 24 at bottom 16 of valve body 12.

The use and operation of backflow valve 10 will now be described with reference to FIGS. 1 through 4. Referring to FIG. 2, during normal operation the weight at first end 30 of closure gate 28 will bias closure gate 28 against rotational stops 36 and into the open position. There closure gate 28 will rest substantially parallel to longitudinal axis 21 of flow passage 20. This will normally be above any flow of liquid passing through flow passage 20. Referring to FIG. 3, as liquid rises in valve body 12 float 38 carries closure gate 28 into a position where the back rushing flow of liquid pushes closure gate 28 into the closed position where it engages first sealing shoulder 22 and second sealing shoulder 24. When the liquid level falls, the weight of float 38 at first end 30 causes closure gate 28 to fall against rotational stops 36 and return to the open position.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A backflow valve, comprising:

a valve body;

a flow passage extending through the valve body, the flow passage having a longitudinal axis; a closure gate having a first end and a second end, the closure gate being pivotally mounted in the flow passage of the valve body for movement between an open position in which the closure gate is substantially centrally positioned within the flow passage on a plane substantially parallel to and immediately above the longitudinal axis of the flow passage and a closed position in which the closure gate is positioned transverse to the longitudinal axis, the closure gate having a midsection positioned pivot axis positioned between the first end and the second end, the closure gate being unbalanced with greater weight being toward the first end;

a rotational stop being secured to the valve body to limit pivotal movement when the closure gate is in the open position;

a float being secured to the first end of the closure gate, the greater weight at the first end biasing the closure gate by force of gravity against the rotational stop and into the open position, the float causing the closure gate to pivotally move in response to a rise in liquid in the flow passage, with a reversal of flow pushing the closure gate to the closed position.

2. The backflow valve as defined in claim 1, wherein in the open position the closure gate is positioned above the longitudinal axis of the flow passage.

\* \* \* \* \*